United States Patent [19]

Fishman

[11] 4,446,716
[45] May 8, 1984

[54] SELF-COMPENSATING CENTRIFUGE ARM

[75] Inventor: Howard M. Fishman, Elkins Park, Pa.

[73] Assignee: Franklin Institute, Philadelphia, Pa.

[21] Appl. No.: 386,294

[22] Filed: Jun. 8, 1982

[51] Int. Cl.³ .................. G01C 25/00; G01L 25/00
[52] U.S. Cl. ........................................... 73/1 DC
[58] Field of Search ............ 73/1 DC, 432 R, 432 A; D24/22

[56] References Cited

U.S. PATENT DOCUMENTS 2,924,092  2/1960  Bourns et al. ................ 73/1 DC
3,067,620  12/1962  Holloway et al. ............ 73/1 DC Primary Examiner—Donald O. Woodiel
Attorney, Agent, or Firm—Dann, Dorfman, Herrell & Skillman

[57] ABSTRACT

A self-compensating centrifuge arm for use in a centrifuge system having drive means for causing rotation of the centrifuge arm around a center of rotation. The centrifuge arm comprises two elongated members, the first elongated member being attached to the drive means for rotation therewith and extending outwardly from the center of rotation a first predetermined length in a first direction to a terminal end portion. The second elongated member has a second predetermined length and a first end which is attached to the first elongated member at the terminal end portion thereof. The second elongated member extends generally parallel to the first elongated member through the center of rotation without being affixed to the drive means.

12 Claims, 5 Drawing Figures

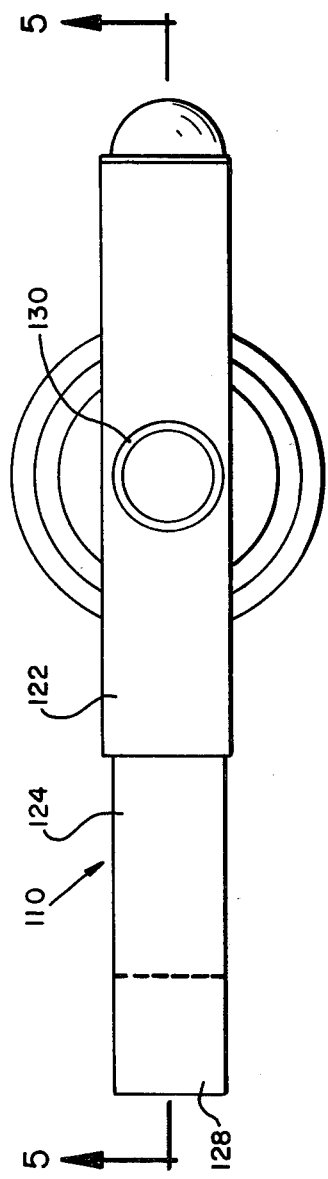
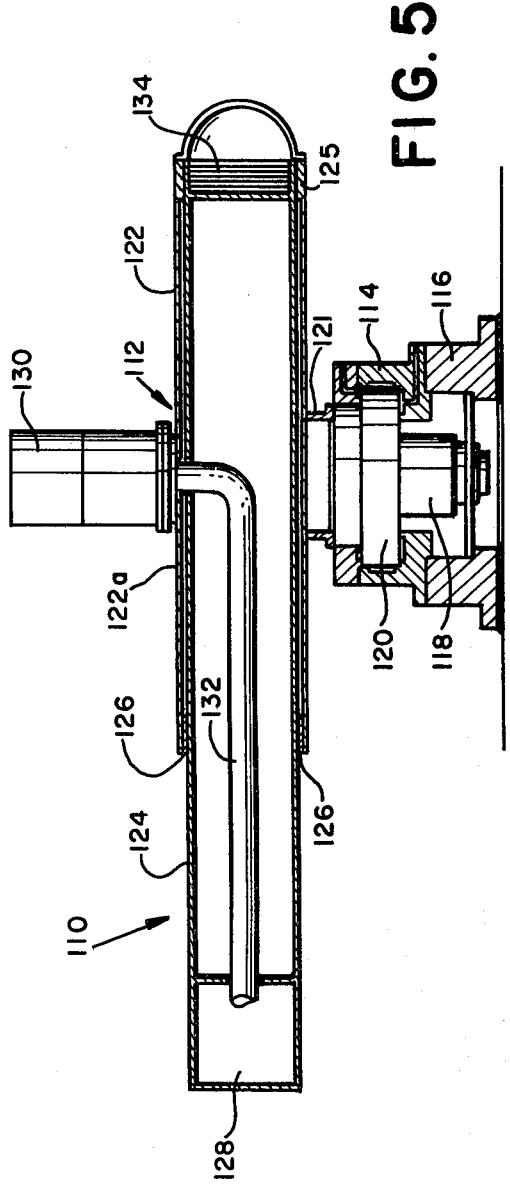

SELF-COMPENSATING CENTRIFUGE ARM

BACKGROUND OF THE INVENTION

The present invention relates generally to centrifuge systems and, more particularly, to an advanced design self-compensating centrifuge arm in a centrifuge system for testing precision instrumentation devices.

DESCRIPTION OF THE PRIOR ART

Centrifuges, and particularly ultra-precision long arm centrifuges, are employed for the testing and calibration of various precision sensors and other instrumentation devices, such as precision accelerometers used in connection with inertial guidance systems. A typical prior art centrifuge system employed for such purposes includes a rotatable centrifuge arm having a predetermined static length (R). A first end of the centrifuge arm is attached to the drive shaft of a precision electric motor of the type which provides a precisely controlled output to impart a precise known rotational speed ($\omega$) to the centrifuge arm. The other end of the centrifuge arm includes a test specimen chamber or other such means or apparatus for retaining the instrumentation device being tested or calibrated.

In operation, the instrumentation device being tested or calibrated is placed in the test specimen chamber or is otherwise attached to the end of the centrifuge arm and the centrifuge arm is rotated by operation of the motor at a specific precise rotational speed. Since both the static length of the centrifuge arm and its rotational speed are known, the acceleration of the instrumentation device can be determined by multiplying the centrifuge arm length by the square of the rotational speed ($a = R \times \omega^2$). In this manner, the instrumentation device can be accurately tested and/or calibrated.

In theory, a centrifuge of the type described above will operate in the manner described to provide a constant radial or centripetal acceleration which may be used to precisely test or calibrate a particular instrumentation device. However, the theoretical approach is not directly applicable in actual operation of the centrifuge system. In the actual operation of a centrifuge system of the type described above, the length of the static centrifuge arm (R) does not remain constant due to various factors, such as, the centrifugal forces acting upon the centrifuge arm as it rotates and temperature fluctuations which may occur during operation. Both the centrifugal forces and the temperature fluctuations tend to change the effective length of the centrifuge arm by a variable amount ($\Delta R$). Thus, to achieve a precise known acceleration upon the instrumentation device being tested or calibrated, some correction must be made.

The prior art centrifuge systems typically require additional peripheral instrumentation, calibration and temperature control equipment and require frequent recalibration in order to achieve relatively consistent results. Such systems may be unreliable for use in connection with applications in which ultra-precision measurement of both arm length and rotational speed is required. Thus, in addition to being somewhat imprecise, the prior art systems are expensive to operate and maintain.

The present invention provides a centrifuge system having a self-compensating centrifuge arm which maintains a constant effective arm length (R) for any rotational speed or temperature variation, thus overcoming the operation and maintenance problems with prior art systems used in ultra-precision applications.

SUMMARY OF THE INVENTION

Briefly stated, the present invention comprises a self-compensating centrifuge arm for a centrifuge system having drive means for causing rotation of the centrifuge arm around a center of rotation. The centrifuge arm comprises a first elongated member attached to the drive means for rotation therewith, the first elongated member having a first predetermined length and extending outwardly from the center of rotation in a first direction to a terminal end portion. The centrifuge arm further comprises a second elongated member having a second predetermined length and a first end attached to the first elongated member at the terminal end portion thereof. The second elongated member extends through the center of rotation without being affixed to the drive means and terminates at a second end. In a preferred embodiment of the invention, the first member is tubular in form and the second member is positioned within the first member.

BRIEF DESCRIPTION OF THE DRAWINGS

The foregoing summary, as well as the following detailed description of a preferred embodiment of the invention, will be better understood when read in conjunction with the appended drawings, in which:

FIG. 4 is a plan view of a centrifuge system showing a preferred embodiment of the self-compensating centrifuge arm of the present invention; and FIG. 5 is a section view of the centrifuge system of FIG. 4 taken along line 5—5.

DESCRIPTION OF THE PREFERRED EMBODIMENT

Figure 1:
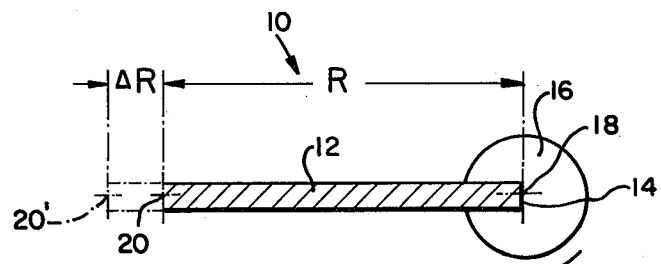
FIG. 1 is a schematic plan view of a mathematical model of a typical prior art centrifuge system and showing the centrifuge arm in section.

Referring to FIG. 1, there is shown a schematic diagram of a typical prior art centrifuge system 10. The centrifuge system 10 includes a typical prior art centrifuge arm 12 having a first end 14 attached to a drive means 16, which may include a precision electric motor. The precision electric motor of drive means 16 causes the attached centrifuge arm 12 to rotate (as indicated by $\omega$) around a generally fixed center of rotation 18.

The centrifuge arm 12 extends a precise predetermined distance R from the center of rotation 18 to its second or terminal end 20. A test specimen chamber or other such means or apparatus for retaining an instrumentation device (not shown) to be tested or calibrated may be suitably attached to or included on the terminal end 20 of the centrifuge arm 12. As discussed above, by rotating the centrifuge arm 12 at a known speed ($\omega$), it is theoretically possible to determine the precise radial acceleration (a) of the terminal end 20 of the centrifuge arm and, thus, the acceleration of an instrumentation device (not shown) located at the terminal end 20 of the centrifuge arm 12. In this manner, the instrumentation device may be suitably tested and/or calibrated.

It is well known in the art that the actual or effective length of a conventional centrifuge arm, such as arm 12, will vary as a result of the action of centrifugal forces and temperature fluctuations imposed while the centrifuge arm 12 is being rotated. In general, the action of the centrifugal forces tends to cause the length of the centrifuge arm 12 to increase, whereas fluctuations in the temperature may cause the length of the centrifuge arm 12 to increase for increased temperatures and to decrease for decreased temperatures. In FIG. 1, an increase ($\Delta R$) in the effective length of the centrifuge arm 12 is indicated, thereby extending the terminal end 20 of the centrifuge arm 12 to a point identified as 20' (shown in phantom). It is noted that, for purposes of clarity in FIG. 1, the actual length of the extension of the centrifuge arm $\Delta R$ is shown somewhat exaggerated compared to the normal overall length of the arm. As discussed above, since the effective length of the centrifuge arm 12 does not remain constant during rotation, the actual acceleration of the terminal end 20 of the centrifuge arm 12 is determined by the effective arm length $(R+\Delta R)$ times the angular velocity squared $(\omega^2)$. Thus, in order to determine a precise acceleration of the terminal end 20 of the centrifuge arm 12, a precise knowledge of the value of the change in length $\Delta R$ or the precise knowledge of the effective length $R+\Delta R$ of the centrifuge arm 12 is required in order to properly correct or compensate for the change in the effective length of the centrifuge arm 12. As also discussed above, the prior art methods of correcting or compensating for variations in the effective length of the prior art centrifuge arms may introduce inaccuracies into the centrifuge system and require additional equipment and calibration expense.

Figure 2:
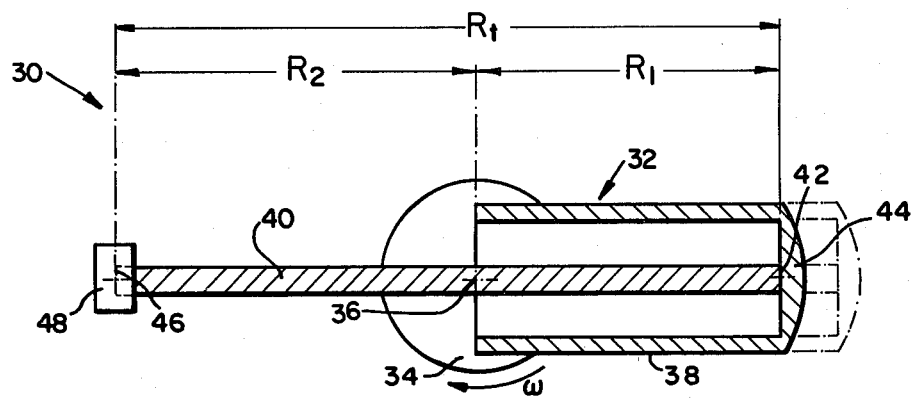
FIG. 2 is a schematic plan view of a mathematical model of a centrifuge system showing the self-compensating aspects of the centrifuge arm of the present invention and showing the centrifuge arm in section.

FIG. 2 shows a schematic diagram of a centrifuge system 30 employing a self-compensating centrifuge arm generally designated 32 in accordance with the present invention. The centrifuge system 30 includes a suitable drive means 34, for causing rotation of the centrifuge arm 32 around a relatively fixed center of rotation 36 in a manner well known in the art.

The centrifuge arm 32 comprises a first elongated member 38, which is preferably tubular in cross section. However, the present invention is not limited to such a tubular member for the first elongated member of the centrifuge arm, since any other suitable elongated member may be alternatively employed within the teaching of the present invention.

As shown in FIG. 2, a first end of member 38 is attached in any suitable known manner to the drive means 34 for rotation therewith. Member 38 extends generally radially outwardly from the center of rotation 36 (toward the right as shown in FIG. 2) a first predetermined distance or length $R_1$ to a terminal end portion 44.

The centrifuge arm 32 further comprises a second elongated member 40 having a first end 42 attached to the terminal end portion 44 of the first member 38. The second member 40 extends generally parallel to and is located within the tubular member 38, and passes through the center of rotation 36 without being affixed to the drive means 34 in any manner at the center of rotation 36. The second member 40 extends a second predetermined length $R_t$ (shown in FIG. 2) from its first end 42 to its terminating second end 46. The length of the second member 40 between the center of rotation 36 and its second end 46 has been designated $R_2$. In the preferred embodiment, the second member 40 is formed as a generally cylindrical member positioned within the first tubular member. However, it should be appreciated that the present invention is not limited to the use of a cylindrical member for the second member, but the second member could be provided by any other suitable type of member in accordance with the teaching of the present invention.

A suitable test specimen chamber or other retaining means or apparatus 48 may be positioned at or on the second end 46 of elongated member 40 for containing or retaining an instrumentation device (not shown) for testing or calibration.

A detailed mathematical discussion of the basis of operation of the centrifuge system 30 and specifically arm 32 will hereinafter be presented in conjunction with FIG. 3 which displays all practical aspects of the embodiment including adjustments. It should be appreciated, however, that FIG. 2 shows the self-compensating aspects of the present invention. More specifically, as shown on FIG. 2, the variations in the length of the second member 40 due to the action of the centrifugal forces and temperature acting upon the second member 40 when the centrifuge arm 32 is rotating tend to cause the second member to extend outwardly (toward the left on the drawing) in the same manner as the prior art centrifuge arm 12 in FIG. 1. It should also be appreciated that the strain along each of the members 38 and 40 accumulates so that the terminal end portion 44 is extended to the right as shown in phantom in FIG. 2, but that the second end 46 of the second member 40 remains at the same relative distance from the center of rotation 36. In regard to temperature parameters during rotation of the arm, the first member 38 counterbalances or cancels the effects of temperature fluctuations upon the length of the second member 40 by proper selection of materials and relative lengths of the members 38 and 40, as hereinafter discussed. The net result is that all variations in the length of the second member 40 in effect cancel the variation in length of the first member 38, thereby passively maintaining its second end 46 in the same position relative to the center of rotation 36 (i.e., length $R_2$ remains constant). Thus, the acceleration of the second end 46 of the second member 40 can be accurately determined for a given rotational speed without the need for any correction or compensation.

Figure 3:
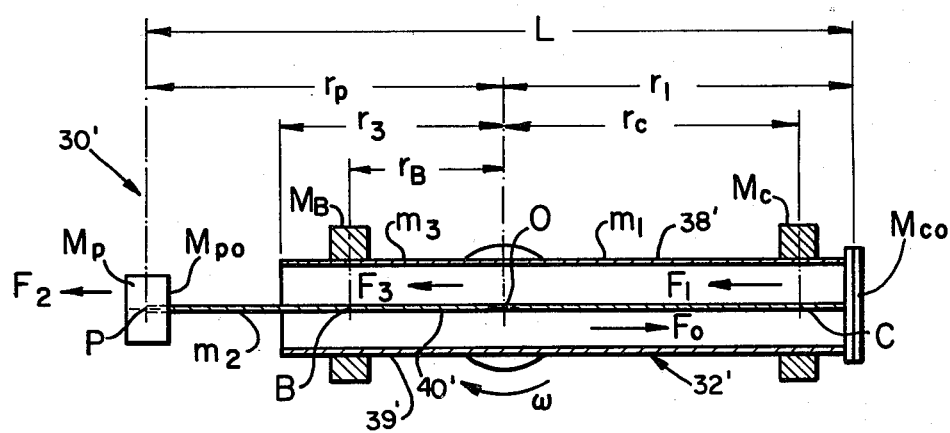
FIG. 3 is a schematic plan view of a mathematical model drawing of a self-compensating centrifuge arm which shows all of the self-compensating features of a practical embodiment of the present invention.

Referring now to FIG. 3, there is shown a schematic mathematical model for demonstrating a general derivation of the elastic deformation features of the self-compensating centrifuge arm 32 of the present invention, when subjected to normal acceleration and thermal loads inherent in centrifuge operation. FIG. 3 depicts a centrifuge arm configuration with structural as well as lumped masses and takes into account the design requirements of being able to vary the instrumentation being tested or payload and to balance the bearing load at the center of rotation 0. In the following derivation, $m_1$ represents the mass of the first tubular member 38' and $M_c$ is its effective lumped mass, $m_2$ represents the mass of the second tubular member 40' and $m_3$ represents the mass of a counterbalancing member 39' which comprises an extension of the first tubular member 38' on the opposite side of the center of rotation having a lumped mass $M_B$.

In the following discussion, the equations of compatibility and equilibrium for the self-compensating centrifuge arm 32' are formulated. For the purpose of this formulation, thermal effects and centrifugal stretching are assumed not to effect local inertial forces which in a higher order of approximation can be neglected.

The basic equations are as follows:

(a) Inertial force for a lumped mass, M, at a distance y from the center of rotation, with angular velocity $\omega$.

$$F_I = -My\omega^2$$

(b) Incremental mass of a beam of length dy $$dm = \rho A dy$$

(c) Equilibrium Force at any section $$F_E = \sigma A$$

(d) Equilibrium of a beam increment $$\frac{d}{dy}(\sigma A) + \rho A y \omega^2 = 0$$

(e) Elastic Strain at any section
$$\epsilon_E = \sigma/E$$

(f) Thermal strain at any section due to a temperature change of T $$\epsilon_T = \alpha T$$

(g) Total Strain at any section $$\epsilon = \epsilon_E + \epsilon_T$$

(h) Extension at location x in terms of exension at location $x_o$ $$\delta(x) = \delta(x_o) + \int_{x_o}^{x} \epsilon dx$$

where
$\sigma$ is the unaxial stress
A is section area
p is the mass density
E is Young's Modulus
$\alpha$ is coefficient of Thermal Expansion The basic equations set forth above may be employed to determine the various forces acting upon the centrifuge system 30' and how they interrelate as follows:

The force at the center of rotation 0 computed from the inertia of first member 38', an adjustable mass $M_c$ located at point C and a fixed lumped mass $M_{co}$, balanced by the tension from the second member 40' is given by the equation:

$$F_0 = (M_c r_c + M_{co} r_1 + m_1 r_1/2)\omega^2 - F_1 \quad (1)$$

The tension force from the inertia of the second member 40', the specimen chamber or retaining apparatus $M_{po}$ and the payload $M_p$ is given by the equation:

$$F_1 = [m_2(r_p - r_1)/2 + (M_p + M_{po})r_p]\omega^2 \quad (2)$$

The force at point C, where $m_1'$ is the mass of the first member 38' from the center of rotation 0 up to point C is given by:

$$F_c = -F_1 + [M_{co} r_1 - m_1'/(2r_c)(r_c^2 - r_1^2)]\omega^2 \quad (3)$$

The force at the center of rotation 0 from the counterbalancing member 39' and its adjustable mass $M_B$ is given by:

$$F_3 = (M_B r_B + m_3 r_3/2)\omega^2 \quad (4)$$

The extension at $M_{co}$ due to the deformation of the first member 38' is given by:

$$\delta_{co} = a_1 r_1 T + [F_c r_1 + \omega^2(M_c r_c^2 + m_1(3r_c^2 - r_1^2)/6)]/(-A_1 E_1) \quad (5)$$

The extension of point P relative to $M_{co}$ is given by:

$$\delta_2 = a_2 L T + \omega^2 L[(M_p + M_{po})r_p + m_2(2r_p - r_1)/6]/(A_2 E_2) \quad (6)$$

The distance ($r_p$) from the center of rotation 0 to point P is constant and equal to the overall system length L minus length $r_1$ if:

$$\delta_{co} = \delta_2 \quad (7)$$

Setting equations (5) and (6) above equal to each other, utilizing equations (2) and (3) above and cancelling the $\omega^2$ common factor, the two uncoupled relationships may be written as set forth below. In the first relationship identified as equation (8), only the inertial effects are considered, the temperature variations being ignored. In the second relationship identified as equations (9) which was derived from relationships (f) and (h) above, only the thermal effects are considered.

$$M_c r_c^2 + M_{co} r_1^2 = (M_p + M_{po})r_p r_1(\gamma + 1) - m_1 r_1^2/3 + m_2 r_1[\gamma(2r_p - r_1) + 3(r_p - r_1)]/6 \quad (8)$$

where $$\gamma = (A_1 E_1 L)/(A_2 E_2 r_1) \quad (9)$$

$$a_1 r_1 = a_2 L$$

In addition, in a practical embodiment, the bearing loads at point O must be balanced by the inertial tensions from the first members 38' and the counterbalancing member 39' ($F_0$ equals $F_3$). Employing equations (1), (2) and (3) and cancelling the $\omega^2$ terms, another independent and compatible parametric relationship may be written as follows:

$$M_B r_B + m_3 r_3/2 = M_c r_c + M_{co} r_1 + m_1 r_1/2 - m_2(r_p - r_1)/2 - (M_p + M_{po})r_p \quad (10)$$

Equations (8), (9) and (10) set forth a mathematical model which allow a designer sufficient flexibility for achieving an operational configuration of the present invention for any given set of circumstances within a particular operating range. Utilizing these equations, it is possible to vary the cross-sectional shape or area of the two members of the centrifuge arm, the material properties of each of the two members of the centrifuge arm, the length and length ratios of the two members of the centrifuge arm and the counterbalances and weights of the members of the centrifuge arm, to provide a self-compensating centrifuge arm for any given set of circumstances within a particular operating range.

Referring now to FIGS. 4 and 5, there is shown a more detailed representation of a centrifuge system 110 including a self-compensating centrifuge arm generally designated 112 in accordance with the present invention. The centrifuge system 110 includes a housing 114 which rests upon a level solid foundation 116 for the purpose of providing long-term stability and safety. The housing 114 contains the drive means, which in this embodiment comprises a precision velocity controlled servo drive 118 and includes a closed-loop speed control system for precise control of rotational speed of the centrifuge arm 112. The centrifuge arm 112 is attached or mounted to the drive shaft 121 of the servo drive 118 for rotation on a captured precision hydrostatic bearing structure 120, which provides superior stiffness and stability at the normal rotational speeds of the centrifuge arm 112. Both the drive means 118 and the bearing structure may be of any suitable type commonly employed in such centrifuge systems.

The first elongated member comprises a generally cylindrical hollow aluminum tube member 122, which is suitably attached to the drive shaft 121 of motor 118 for rotation. The second elongated member comprises a generally cylindrical steel tube member 124 which is positioned within tube member 122 as shown. The two tube members 122 and 124 are attached together at the terminal end portion 125 of the centrifuge arm 112 as shown in FIG. 5. The ratio of the coefficients of thermal expansion of aluminum (of the first member) to steel (of the second member) is approximately 2:1. Therefore, to satisfy the requirements of equation (9) above, the length ratio of tube member 124 to 122 must be 2:1.

Suitable bearings 126 may be employed to provide low friction lateral support between the tube members 122 and 124. A suitable test specimen chamber or retaining apparatus shown schematically as a box-like chamber 128 is attached to the second end of tube 124. Instrumentation (not shown) to be tested and/or calibrated may be placed within the test specimen chamber or retaining apparatus 128. A suitable commutation device 130 comprising, for example, a plurality of slip rings (not shown), may be provided for the transmission of information to and from the instrumentation device being tested or calibrated and may include a suitable communicating cable 132.

The righthand end of the centrifuge arm 112 also includes suitable counterweights 134 to counterbalance the weight of the test specimen chamber or retaining means 128, as well as any instrumentation device being tested or calibrated. In addition, a portion 122a of the outer tube member 122 extends a predetermined distance on the opposite side of the center of rotation from the terminal end portion 125 to provide a means of dynamic counterbalancing of the righthand end of the centrifuge arm 112. The tube members 122 and 124 and the test specimen chamber 128 are faired or provided with suitable fairing or aerodynamic design to reduce aerodynamic drag, minimize power requirements and reduce air turbulence.

By properly selecting the thickness and other properties of the tube members 122 and 124, properly setting of the various counterweights and properly selecting of the materials, equations (8), (9) and (10) above may be satisfied to provide the desired self-compensating features of centrifuge arm 112 for precision operation of the centrifuge system.

From the foregoing description and the accompanying drawings, it can be seen that the present invention provides a self-compensating centrifuge arm for a centrifuge system which provides for improved performance without the need for additional equipment to correct for variations in arm length or periodic recalibration. It will be recognized by those skilled in the art that changes or modifications may be made to the embodiment of the invention shown and described above without departing from the broad inventive concepts of the invention. It is understood, therefore, that this invention is not limited to the particular embodiment shown and described, but it is intended to cover all changes and modifications which are within the scope and spirit of the invention as set forth in the appended claims.

I claim:

1. A self-compensating centrifuge arm for a centrifuge system having drive means for causing rotation of the centrifuge arm around a center of rotation, the centrifuge arm comprising:
   a first elongated member attached to the drive means for rotation, the first elongated member having a first predetermined length and extending outwardly from the center of rotation in a first direction to a terminal end portion; and
   a second elongated member having a second predetermined length and a first end attached to the first elongated member at the terminal end portion thereof, the second elongated member extending through the center of rotation without being affixed to the drive means and terminating at a second end.

2. The self-compensating centrifuge arm of claim 1 wherein the first member is comprised of a first material and the second member is comprised of a second material.

3. The self-compensating centrifuge arm of claim 2 wherein the first member is comprised of aluminum and the second member is comprised of steel.

4. The self-compensating centrifuge arm of claim 2 wherein the first and second materials are selected so that the coefficient of thermal expansion of the first material times the length of the first member from the center of rotation to the terminal end portion is equal to the coefficient of thermal expansion of the second material times the length of the second member.

5. The self-compensating centrifuge arm of claim 1 wherein the first member extends a third predetermined distance on the opposite side of the center of rotation from the terminal end portion to provide dynamic counterbalancing.

6. The self-compensating centrifuge arm of claim 1 wherein the first member comprises a tubular member.

7. The self-compensating centrifuge arm of claim 6 wherein the second member is positioned within the first member.

8. The self-compensating centrifuge arm of claim 7 wherein the first member comprises a hollow, generally cylindrical shaped member.

9. The self-compensating centrifuge arm of claim 1 further including means attached to the first member for dynamic counterbalancing.

10. The self-compensating centrifuge arm of claim 9 wherein the first and second members are faired to reduce aerodynamic drag.

11. The self-compensating centrifuge arm of claim 1 wherein the first member includes counterweights on the terminal end portion thereof.

12. A self-compensating centrifuge arm for a centrifuge system having drive means for causing rotation of the centrifuge arm around a center of rotation, the centrifuge arm comprising:

a first elongated section attached to the drive means for rotation, the first section having a first predetermined length and extending generally radially outwardly from the center of rotation in a first direction to a terminal end portion; and a second elongated section having a second predetermined length and having a first end attached to the first section at the terminal end portion thereof, the second section extending generally parallel to the first section through the center of rotation without being affixed to the the drive means and terminating at a second end.

* * * * *